(12) United States Patent
Hada et al.

(10) Patent No.: US 11,513,060 B2
(45) Date of Patent: Nov. 29, 2022

(54) ABSORPTION ANALYZER

(71) Applicant: HORIBA STEC, CO., LTD., Kyoto (JP)

(72) Inventors: Miyako Hada, Kyoto (JP); Daisuke Hayashi, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 485 days.

(21) Appl. No.: 16/689,455

(22) Filed: Nov. 20, 2019

(65) Prior Publication Data

US 2020/0182776 A1   Jun. 11, 2020

(30) Foreign Application Priority Data

Dec. 5, 2018   (JP) .............................. JP2018-227888

(51) Int. Cl.
*G01N 21/03* (2006.01)
*G01N 21/85* (2006.01)

(52) U.S. Cl.
CPC . *G01N 21/0303* (2013.01); *G01N 2021/0389* (2013.01); *G01N 2021/8578* (2013.01)

(58) Field of Classification Search
CPC ... G01N 2201/06106; G01N 2201/065; G01N 2201/08; G01N 2201/12; G01N 2223/301; G01N 2223/309; G01N 2223/3307; G01N 2223/426; G01N 2223/615; G01N 2223/616; G01N 2223/617;

(Continued)

(56) References Cited

U.S. PATENT DOCUMENTS

2004/0179187 A1* 9/2004 Mettes ................... G01N 21/68
356/316
2011/0304844 A1* 12/2011 Willing ................ G01N 33/006
356/51

(Continued)

FOREIGN PATENT DOCUMENTS

CN    207379917 U  *  5/2018
CN    112703388          4/2021

(Continued)

OTHER PUBLICATIONS

Notice of Allowance issued in JP patent application No. 2018-227888, dated Aug. 9, 2022.

*Primary Examiner* — Michael P Stafira
(74) *Attorney, Agent, or Firm* — Greenblum & Bernstein, P.L.C.

(57) ABSTRACT

In order to provide an absorption analyzer capable of directly measuring an analysis target gas flowing into or produced in a vessel such as a chamber and preventing a measurement error due to moisture condensation, the absorption analyzer is adapted to include: a light emission module that is attached covering a first opening of the vessel into which the analysis target gas flows or in which the analysis target gas is produced and emits light into the vessel; and a light detection module that detects the light emitted from the light emission module and passing through the vessel. In addition, the light emission module is adapted to include: a base flange that is attached around the first opening on an outer surface of the vessel; a window material whose outer surface is tilted at a predetermined angle; a seal member; and a pressing body.

12 Claims, 6 Drawing Sheets

(58) Field of Classification Search
CPC .............. G01N 2223/643; G01N 23/00; G01N 23/087; G01N 23/12; G01N 23/225; G01N 2333/445; G01N 2333/70514; G01N 2333/70589; G01N 24/006; G01N 25/14; G01N 25/20; G01N 25/48; G01N 25/56; G01N 2500/00; G01N 27/00; G01N 27/30; G01N 27/3273; G01N 27/407; G01N 27/4167; G01N 2800/26; G01N 30/00; G01N 30/24; G01N 30/36; G01N 30/40; G01N 30/7273; G01N 30/8631; G01N 31/10; G01N 31/164; G01N 33/0014; G01N 33/0039; G01N 33/02; G01N 33/04; G01N 33/1846; G01N 33/2022; G01N 33/22; G01N 33/241; G01N 33/2829; G01N 33/287; G01N 33/2876; G01N 33/4833; G01N 33/493; G01N 33/5005; G01N 33/5094; G01N 33/525; G01N 33/532; G01N 33/543; G01N 33/54326; G01N 33/54333; G01N 33/54373; G01N 33/552; G01N 33/553; G01N 33/563; G01N 33/56916; G01N 33/6803; G01N 33/6842; G01N 33/723; G01N 33/82; G01N 35/00663; G01N 35/10; G01N 35/1097; G01N 7/02; G01N 9/32

See application file for complete search history.

(56) References Cited

U.S. PATENT DOCUMENTS

| | | | | |
|---|---|---|---|---|
| 2017/0138846 | A1* | 5/2017 | Alizadeh | G01J 3/28 |
| 2017/0353996 | A1* | 12/2017 | Lee | H05B 3/12 |
| 2019/0271637 | A1* | 9/2019 | Nakahara | G01N 21/05 |
| 2022/0034794 | A1 | 2/2022 | Nagase et al. | |

FOREIGN PATENT DOCUMENTS

| | | | | | |
|---|---|---|---|---|---|
| JP | 2005235868 | A | * | 9/2005 | ........... C07C 17/361 |
| JP | 2007170841 | A | * | 7/2007 | ......... G01N 21/3504 |
| JP | 2007-285826 | | | 11/2007 | |
| JP | 2008177262 | A | * | 7/2008 | |
| JP | 2009085872 | A | * | 4/2009 | |
| JP | 2010060350 | A | * | 3/2010 | |
| JP | 2010-190824 | A | | 9/2010 | |
| JP | 2012154915 | A | * | 8/2012 | |
| JP | 2013127385 | A | * | 6/2013 | |
| JP | 2013127414 | A | * | 6/2013 | |
| JP | 2016142738 | A | * | 8/2016 | ............ G01J 3/4338 |
| JP | 2016-180728 | | | 10/2016 | |
| WO | WO-2017089550 | A1 | * | 6/2017 | ........... G01D 11/245 |
| WO | WO-2017216847 | A1 | * | 12/2017 | ............. H05G 2/006 |

* cited by examiner

ABSORPTION ANALYZER

TECHNICAL FIELD

The present invention relates to an absorption analyzer that analyzes an analysis target gas on the basis of absorbance.

BACKGROUND ART

In a semiconductor manufacturing process, various types of microfabrication and treatment are performed on a semiconductor substrate (silicon wafer) surface. For such various types of microfabrication and treatment, a variety of process gases such as etching gases, reactive gases for epitaxial growth, and reactive gases for CVD (chemical vapor deposition) are used. However, it is known that if moisture is contained in such a process gas, the process gas and the moisture, or the substrate surface and the moisture react with each other to produce an unnecessary byproduct, and as a result, the yield of manufactured semiconductor products is significantly reduced.

For this reason, as disclosed in Patent Literature 1, an absorption analyzer that uses, as an optical cell, a part of an exhaust flow path through which various types of gases are exhausted from a chamber as a vacuum vessel is provided to monitor moisture amounts in the gases contained in exhaust gas, impurities to be eliminated from the chamber, and the like.

Meanwhile, such an absorption analyzer only monitors the gases exhausted from the chamber, and therefore even when no impurity is detected by the absorption analyzer, a trace amount of impurity may remain in the chamber.

Also, when on the basis of absorbance, desiring to determine whether or not a trace amount of impurity exists as described above, for example, if moisture is condensed on a window material forming an optical cell, a measurement error may occur to make an erroneous determination.

CITATION LIST

Patent Literatures

Patent Literature 1: Japanese Unexamined Patent Application Publication No. 2010-190824

SUMMARY OF INVENTION

Technical Problem

The present invention has been made in consideration of the problems as described above, and intends to provide an absorption analyzer capable of directly measuring an analysis target gas flowing into or generated in a vessel such as a chamber and preventing a measurement error due to moisture condensation.

Solution to Problem

That is, the absorption analyzer according to the present invention includes: a light emission module that is attached covering a first opening of a vessel into which an analysis target gas flows or in which the analysis target gas is produced and emits light into the vessel; and a light detection module that detects the light emitted from the light emission module and passing through the vessel. In addition, the light emission module includes: a base flange that is attached around the first opening on an outer surface of the vessel; a window material whose outer surface is tilted at a predetermined angle with respect to an inner surface in contact with the inside of the vessel; a seal member that is sandwiched between the base flange and the inner surface of the window material; and a pressing body including a fixing surface fixed to the base flange and a tilted surface pressing the outer surface of the window material against the base flange side.

In such a configuration, the analysis target gas can be analyzed on the bases of the light passing through the vessel, and therefore for example, if the analysis target gas exists in the vessel, the absorbance of it can be directly measured.

Further, even when the window material has the outer surface tilted at the predetermined angle in order to eliminate the effect of interference due to the light emitted from the light emission module, the pressing body includes the tilted surface, and therefore the inner surface of the window material can be pressed straight against the seal member to uniformly compress the seal member. For this reason, it can be prevented that the seal member is non-uniformly compressed to allow the window material to contact with the base flange at an unexpected point and thereby the window material is cooled to cause moisture condensation on the inner surface of the window material because of moisture existing in the vessel.

From these, the presence or absence of a trace amount of the analysis target gas existing in the vessel can be accurately determined on the basis of the absorbance.

In order to prevent the window material from contacting with the base flange to lose heat and causing a state where moisture condensation is likely to occur on the inner surface of the window material, it is only necessary that, in a state where the pressing body is fixed to the base flange, the window material compresses the seal member and the inner surface of the window material separates from the base flange.

Specific configurations for preventing the window material from contacting with the base flange include one in which the base flange includes: a through hole inside which the window material and a part of the pressing body are arranged; a support part that protrudes inward from an inner circumferential surface of the through-hole and supports the seal member; and an attachment surface attached with the fixing surface of the pressing body, and in a state where the fixing surface of the pressing body is fixed to the attachment surface of the base flange, the window material separates from the inner circumferential surface of the through-hole and from the support part.

In order to make it possible to efficiently heat the window material and make it more difficult to cause moisture condensation on the inner surface of the window material, it is only necessary that the light emission module further includes a sheet heater provided on a side surface of the window material.

In order to reliably keep the temperature of the window material at a temperature preventing moisture condensation, it is only necessary that the light emission module further includes a temperature sensor that measures the temperature of the window material, and the absorption analyzer further includes a temperature controller that, on the basis of a measured temperature measured by the temperature sensor and a set temperature, controls the sheet heater.

In order to make it possible for the light emission module to prevent heat dissipation from a member in contact with the window material while preventing using a material causing contamination for a part in contact with the inside of the vessel, it is only necessary that the base flange is made of metal, and the pressing body is made of resin.

Specific configurations suitable for preventing the heat of the window material from being dissipated via the pressing body include one in which the pressing body is formed of polyphenylene sulfide (PPS).

In order to make it possible to analyze the analysis target gas in the vessel using a simple light path and make it easy to attach the light emission module and the light detection module, it is only necessary that the light detection module is attached covering a second opening that is formed opposite to the first opening of the vessel.

For example, specific configuration examples for determining the presence or absence of the analysis target gas in the vessel include one in which the absorption analyzer further includes a concentration calculation part that, on the basis of the output of the light detection module, calculates the concentration of the analysis target gas.

For example, in order to make it possible to configure the absorption analyzer according to the present invention with use of a structure formed around the first opening of the vessel, such as a view port, it is only necessary that the absorption analyzer includes: a light emission module that is attached covering the first opening of the vessel into which an analysis target gas flows or in which the analysis target gas is produced and emits light into the vessel; and a light detection module that detects the light emitted from the light emission module and passing through the vessel, and the light emission module includes: a window material whose outer surface is tilted at a predetermined angle with respect to an inner surface in contact with the inside of the vessel; a seal member that is sandwiched between the circumference of the first opening and the inner surface of the window material on an outer surface of the vessel; and a pressing body including a fixing surface fixed to the outer surface of the vessel and a tilted surface pressing the outer surface of the window material against the vessel side.

Advantageous Effects of Invention

As described above, in the absorption analyzer according to the present invention, even the window material having, for example, a wedge can be pressed straight by the tilted surface of the resin-made pressing body, and the seal member can be uniformly compressed. For this reason, while allowing the seal member to achieve sufficient sealability, the window material can be prevented from contacting with the metallic base flange. Accordingly, the heat of the window material can be prevented from being dissipated from the base flange to cause moisture condensation on the inner surface of the window material because of moisture in the vessel.

DESCRIPTION OF EMBODIMENTS

An absorption analyzer 100 in one embodiment of the present invention will be described with reference to FIGS. 1 to 5.

The absorption analyzer 100 of the present embodiment is one that, in a semiconductor manufacturing process, monitors whether or not an analysis target gas exists in a chamber C into which various types of gases are supplied.

Note that the analysis target gas in the present embodiment is a process gas flowing into the chamber C as a vessel or a gas produced by the reaction of the process gas or the like in the chamber C, and a gas desired to be completely eliminated from inside the chamber C under predetermined conditions. That is, the analysis target gas is a gas to be discharged from inside the chamber C by, for example an exhaust function of the chamber C, and even if the analysis target gas exists in the chamber C, the amount of it is a trace.

Figure 1:
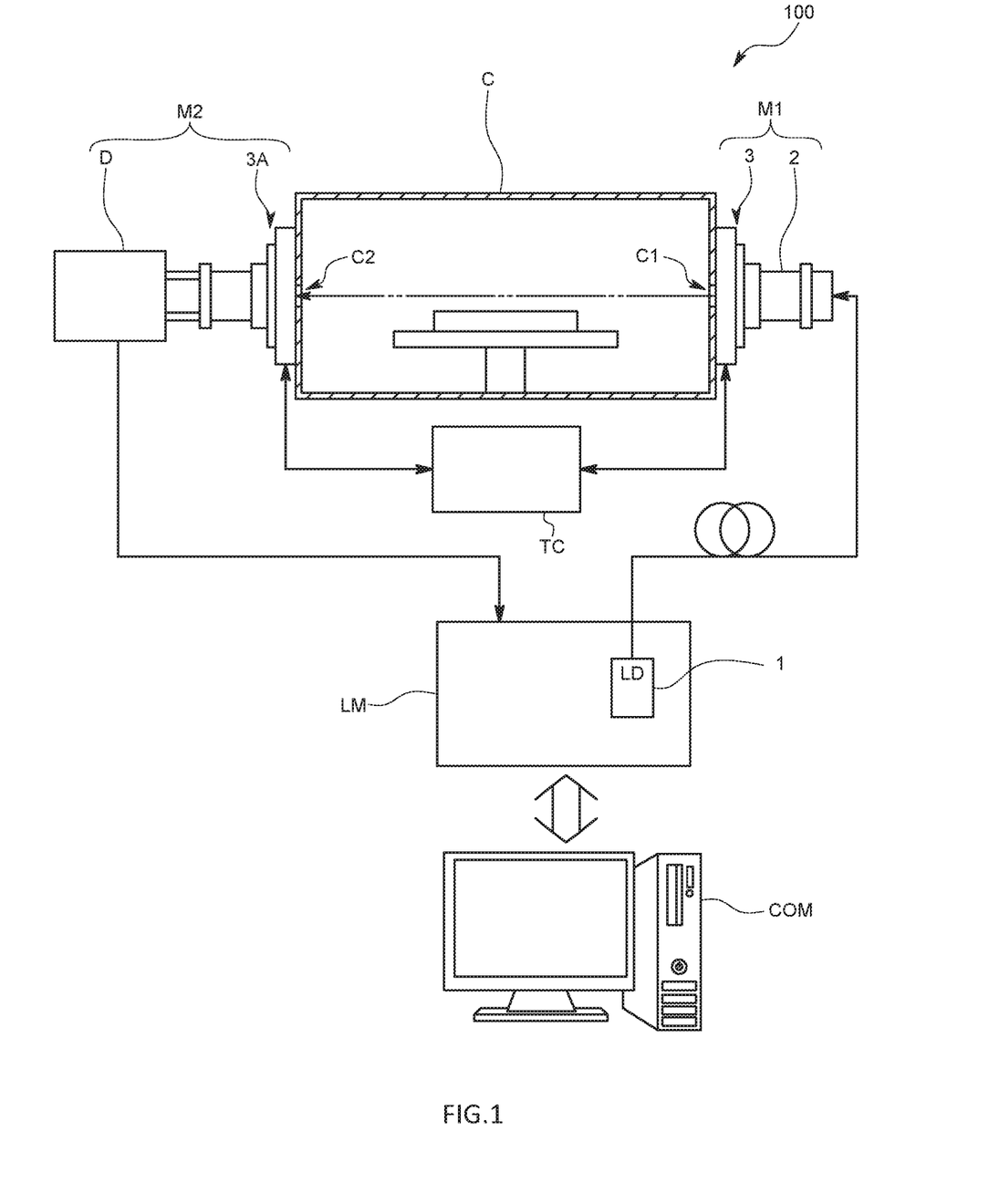
FIG. 1 is a schematic diagram illustrating an absorption analyzer in one embodiment of the present invention.

Specifically, as illustrated in FIG. 1, the absorption analyzer 100 includes: a light emission module M1 that is attached to the outer surface of a partition wall constituting the chamber C; a laser module LM that inputs laser light to the light emission module M1; a light detection module M2 that detects the light emitted from the light emission module M1 and passing through the vessel; a temperature controller TC that controls the temperatures of the light emission module M1 and light detection module M2; and an arithmetic unit COM that performs data logging and the like.

The light emission module M1 is, for example, attached covering a first opening C1 formed in a side surface of the chamber C and introduces the laser light into the chamber C through the first opening C1. The light emission module M1 includes: a connection part 2 through which the laser light emitted from a laser light source 1 in the laser module LM is inputted via an optical fiber; and a flange part 3 that is attached forming a seal on the outer surface of the chamber C. The laser light emitted from the laser light source 1 passes through the connection part 2 and the flange part 3, and travels through the chamber C.

Next, the detailed configuration of the flange part 3 of the light emission module M1 will be described with reference to FIGS. 2 to 4.

Figure 2:
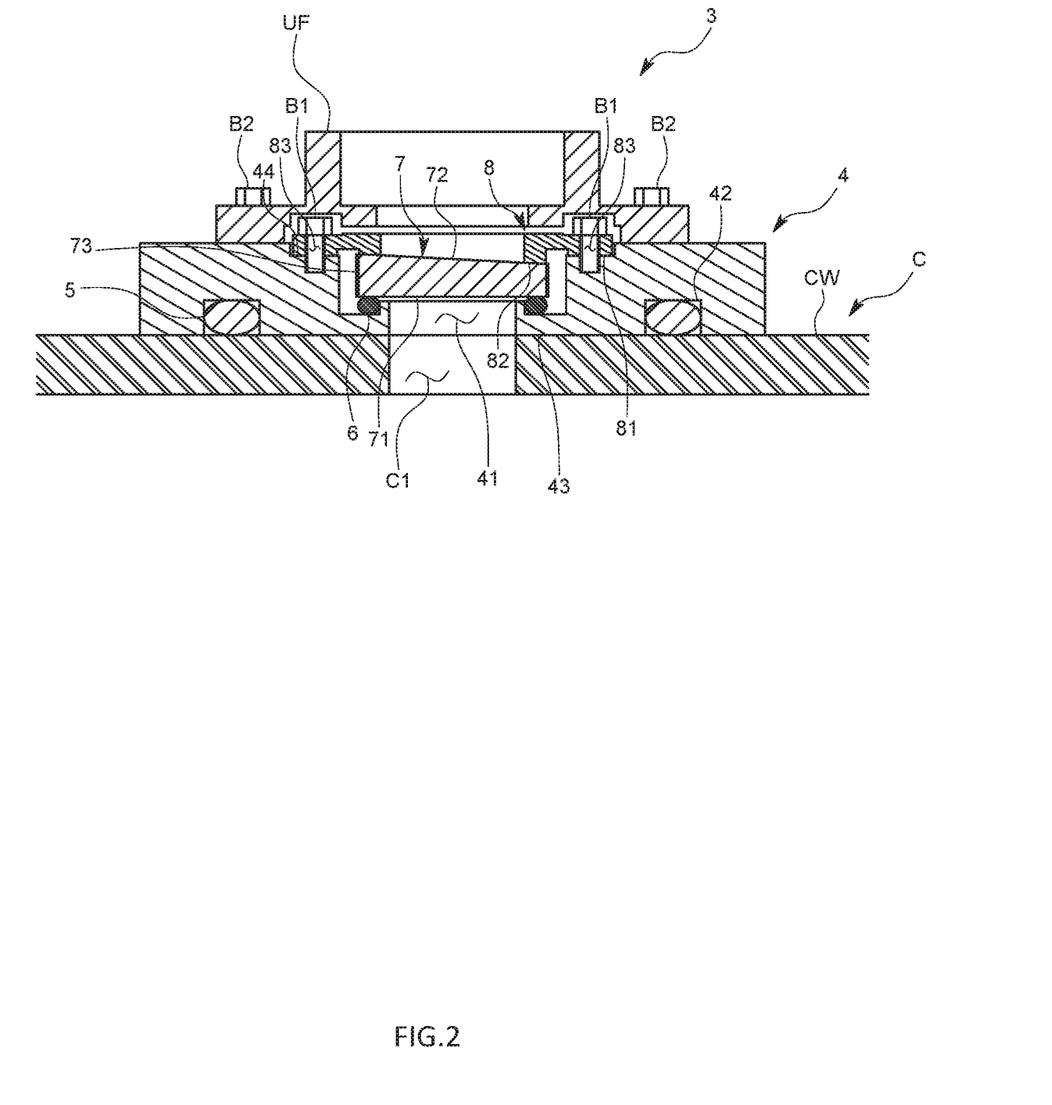
FIG. 2 is a schematic diagram illustrating the structure of a flange part in a light emission module in the same embodiment.

As illustrated in FIG. 2, the flange part 3 is formed in a substantially multistep cylindrical shape, and includes: a first seal member 5; a base flange 4; a second seal member 6; a window material 7; a pressing body 8; and an upper flange UF. Here, the respective seal members are O-rings.

The base flange 4 is a substantially disk-shaped metal plate whose central part is formed with a through-hole. The base flange 4 is one attached to the outer surface CW of the chamber C so that the first opening part C1 and the through-hole 41 communicate with each other. The inner surface of the base flange 4 attached to the outer surface of the chamber C is formed with an annular groove 42 for containing the first seal member 5 forming a vacuum seal between the outer surface of the chamber C and the inner surface of the base flange 4. On the other hand, the outer surface of the base flange 4 is formed with an attachment surface 44 attached with the outer circumferential part of the pressing body 8.

In addition, on the chamber C side of the through-hole 41, an annular support part 43 for supporting the second seal member 6 is protruded inward in the radial direction of the through-hole 41. That is, in the through-hole 41, the second seal member 6, the window material 7, and a part of the pressing body 8 are arranged sequentially from the chamber C side, and by allowing the pressing body 8 to press the window member 7 against the base flange 4 side, the second seal member 6 is compressed to form the vacuum seal between the inner surface of the window material 7 in contact with the space inside the chamber C and the support part 43 of the base flange 4.

The window material 7 is one made of quartz glass used for optical measurement, and formed in a shape obtained by obliquely cut one end surface of a flat cylinder. For this reason, with respect to the inner surface 71 of the window material 7 in contact with the space inside the chamber C, the outer surface 72 is tilted at a predetermined angle. Accordingly, the inner surface 71 and outer surface 72 of the window material 7 are not parallel, and therefore, for example, reflected components of the laser light by the respective surfaces can be prevented from interfering with each other.

Figure 3:
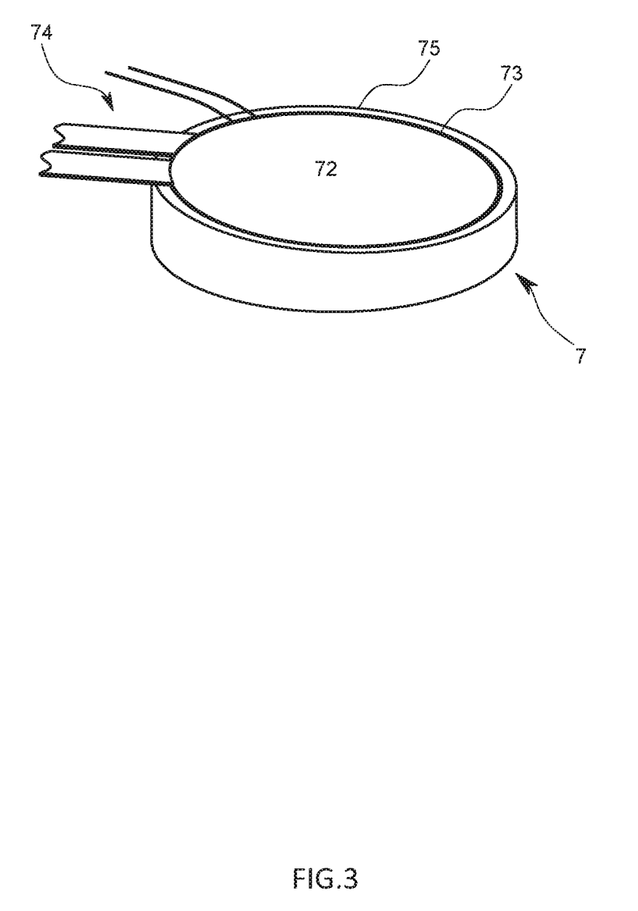
FIG. 3 is a schematic diagram illustrating the configuration of a window material and a temperature control mechanism in the same embodiment.

As illustrated in FIG. 3, a sheet heater 73 is wound on a large part of the side surface of the window material 7, and configured to be able to directly heat the window material 7 itself. That is, the window material 7 is heated without another member such as the base flange 4. Also, in an area where the sheet heater 73 is not provided on the side surface of the window material 7, a thermocouple is provided as a temperature sensor 74 so as to directly contact with the side surface of the window material 7. That is, the thermocouple is configured to be able to measure the temperature of the window material 7 itself. On the outer side of the sheet heater 73 and the thermocouple, a resin-made heat insulating band 75 is wound surrounding the window material 7.

Figure 4:
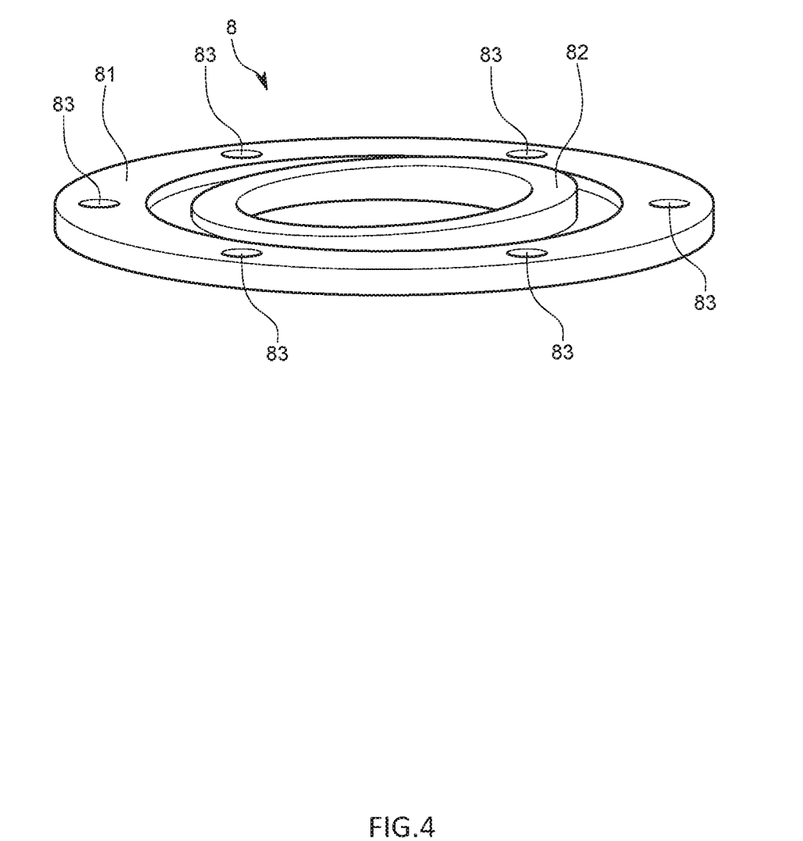
FIG. 4 is a schematic perspective view illustrating the structure of a pressing body in the same embodiment.

As illustrated in FIG. 4, the pressing body 8 is a substantially flat two-step cylindrical member in which the central part is formed with an opening and the circumference of the opening is protruded. The pressing body 8 is fixed to the base flange 4 by bolts B1, and thereby the central part thereof is brought into contact with the outer surface 72 of the window material 7 to press the window material 7 against the base flange 4 side. The pressing body 8 is formed of resin in order to contact with the outer surface 72 of the window material 7 to prevent the heat of the window material 7 from being easily dissipated. Specifically, the pressing body 8 is formed of polyphenylene sulfide (PPS). Also, between the pressing body 8 and the window material 7, no seal member is provided, and the pressing body 8 is configured to directly contact with the window material 7. That is, the second seal member 6 forms the vacuum seal, and therefore any seal is not separately formed between the pressing body 8 and the window material 7. For this reason, if both the inner surface 71 and outer surface 72 of the window material 7 are respectively provided with seal members, the parallelism between the inner surface 71 of the window material 7 and the attachment surface 44 of the base flange 4 is easily lost when the pressing body 8 presses the window material 7, whereas in the present embodiment, the second seal member 6 can be compressed while keeping the parallelism between the respective surfaces. Also, since the pressing body 8 is made of resin and present not on the vacuum side but on the atmospheric pressure side, the resin component of the pressing body 8 is never evaporated into the chamber C to cause contamination.

Describing the structure of the pressing body 8 in detail, the pressing body 8 includes: a flat ring-shaped outer circumferential part; and a central part having a shape obtained by obliquely cut one end surface of a substantially flat cylinder. The outer circumferential part is formed with an annular-shaped fixing surface 81 fixed to the attachment surface 44 that is the outer surface of the base flange 4. The fixing surface 81 is formed with six bolt insertion holes 83 at regular intervals in the circumferential direction, and the bolts B1 are inserted into the respective bolt insertion holes 83 and screwed into screw holes opened in the attachment surface 44 of the base flange 4. The central part of the pressing body 8 is formed with a tilted surface 82 that is tilted with respect to the attachment surface 44 of the base flange 4 in a state of fixation to the base flange 4. In other word, the tilted surface 82 is tilted with respect to the inner surface 71 of the window material 7 in a state of fixation to the base flange 4, and the tilt angle of the tilted surface 82 with respect to the fixing surface 81 is set to almost the same angle as the tilt angle of the outer surface 72 with respect to the inner surface 71 of the window material 7. For this reason, as illustrated in FIG. 2, the tilted surface 82 of the pressing body 8 and the outer surface 72 of the window material 7 can be fitted together.

In a state where the fixing surface 81 of the pressing body 8 is fixed to the attachment surface 44 of the base flange 4, and the tilted surface 82 of the pressing body 8 presses the outer surface 72 of the window material 7 against the base flange side 4, the inner surface 71 of the window material 7 is set to contact with only the second seal member 6 and to separate from the support part 43 of the base flange 4. That is, with the fixing surface 81 of the pressing body 8 as a reference, the protruding amount of the central part of the pressing body 8 is set so as to compress the second seal member 6 to form the vacuum seal and also form the gap between the inner surface 71 of the window material 7 and the support part 43 of the base flange 4.

The upper flange UF is a part attached with the connection part 2, and fixed by bolts B2 so as to contact with only the base flange 4 without contacting with the pressing body 8. That is, the upper flange UF is configured to prevent the heat of the window material 7 from being dissipated to the upper flange UF via the pressing body 8.

The light detection module M2 is attached covering a second opening C2 formed in the surface opposite to the side surface formed with the first opening C1 of the chamber C. The laser light passing through the chamber C and then passing through the second opening C2 is detected by a photodetector D in the light detection module M2, and a signal corresponding to the intensity of the detected light is outputted to the laser module LM. Also, the light detection module M2 is attached to the outer surface of the chamber C via a flange part 3A that is similar to the above-described flange part 3 of the light emission module M1. In addition, detailed description is omitted because of redundancy.

Figure 5:
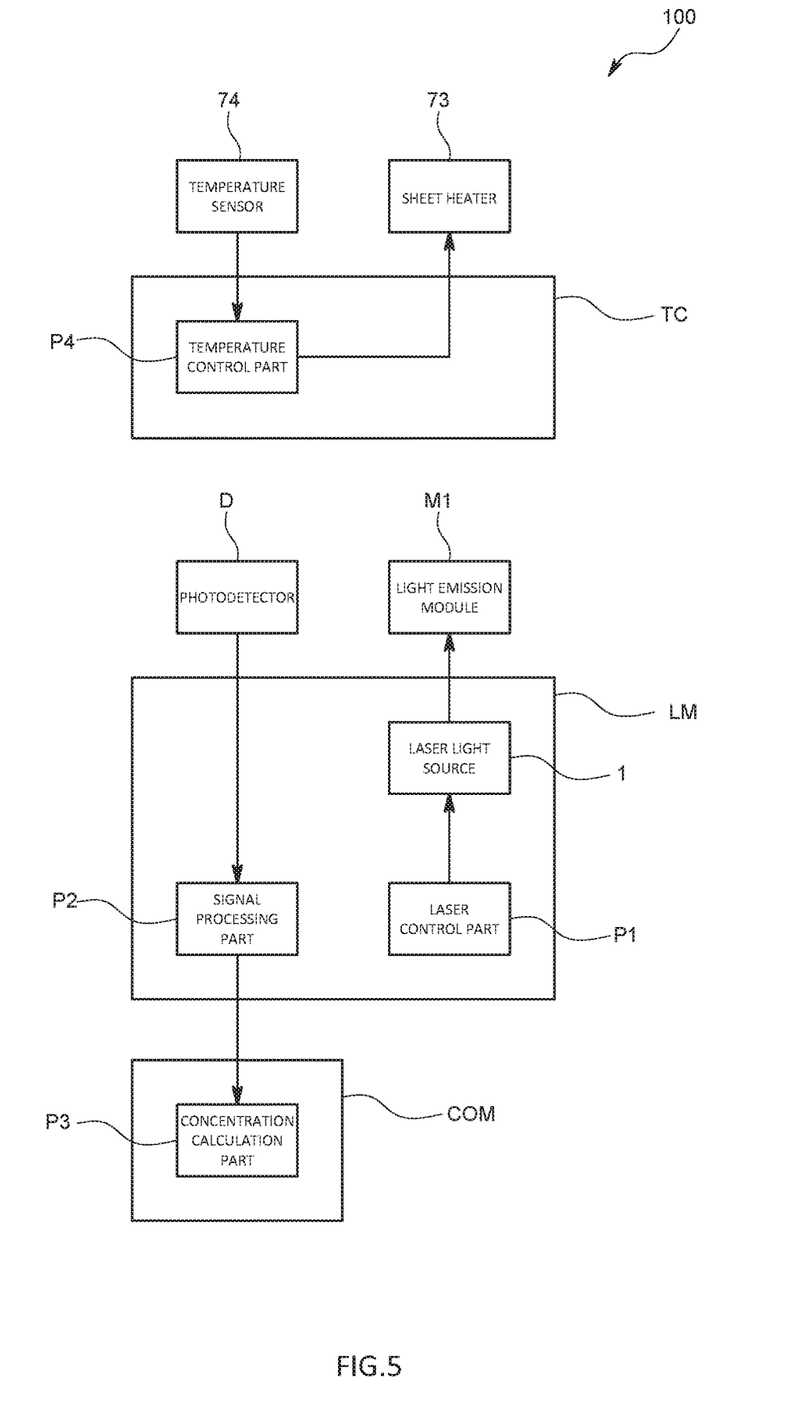
FIG. 5 is a functional block diagram of the absorption analyzer in the same embodiment.

The laser module LM is one provided with the laser light source 1 and a system including a CPU, a memory, an A/D converter, a D/A converter, and the like, and as illustrated in FIG. 5, fulfills functions as a laser control part P1 and a signal processing part P2 by executing a program stored in the memory.

The laser control part P1 controls voltage or the like to be applied to the laser light source 1 so as to emit the laser light that has a wavelength corresponding to the absorption peak of the analysis target gas.

The signal processing part P2 is one that converts the output signal from the photodetector D into a state that is easy-to-use for, for example, concentration calculation or the like in the arithmetic unit COM such as a personal computer, and then outputs the resulting state.

The arithmetic unit COM logs data outputted from the signal processing part P2, and also fulfills a function as, for example, a concentration calculation part P3. The concentration calculation part P3 calculates absorbance from the output of the signal processing part P2 and on the basis of the absorbance, calculates the concentration of the analysis target gas in the chamber C.

The temperature controller TC is one that controls voltage to be applied to the sheet heater 73 so as to keep the temperature of the window material 8 of the light emission module M1 and the temperature of a window material of the light detection module M2 constant and thereby controls the temperatures. Inside the temperature controller TC, a temperature control program is executed to implement a function as a temperature control part P4. The temperature control part P4 controls the voltage to be applied to the sheet heater 73 so that the deviation between a measured temperature measured by the temperature sensor 74 and a preset set temperature decreases. In addition, the set temperature is set to, for example, a temperature higher than the boiling point of water under the pressure inside the chamber C.

In the absorption analyzer 100 of the present embodiment configured as described above, since the pressing body 8 for pressing the window material 7 has the tilted surface 82 fitted to the window material 7 formed with a wedge, the second seal member 6 can be pressed straight against the support part 43 of the base flange 4. For this reason, the second seal member 6 can be uniformly compressed, and the window material 7 can be prevented from unexpectedly moving and partially contacting with the base flange 4 as in the case of for example, allowing a flat surface to press the window material 7 formed with a wedge.

Accordingly, as illustrated in FIG. 2, the window material 7 can be brought into contact with only the second seal member 6 and the resin-made pressing body 8 without contacting with the metallic base flange 4, and therefore the heat of the window material 7 can be prevented from being easily transferred to another member.

As described above, the window material 7 is configured to prevent the heat from being easily dissipated therefrom, and also directly heated by the sheet heater 73, and therefore can be continuously kept at a temperature preventing moisture condensation.

From these, it is possible to prevent moisture from being condensed on the inner surface 71 of the window material 7 even if the moisture exists in the chamber C, and thereby prevent affecting the laser light emitted from the light emission module M1 and giving an error to the light intensity in the light detection module M2.

Accordingly, even when the amount of the analysis target gas is a trace, the concentration of it can be accurately calculated.

Also, since the concentration is calculated on the basis of the absorbance of the laser light passing through the chamber C, a point where it is desirable to actually know the concentration of the analysis target gas can be set as a measurement point, and a time delay and an error at the time of measurement can be made as small as possible. In addition, because of a simple single-path configuration, restrictions on attaching the light emission module M1 and the light detection module M2 to the chamber C are also small.

Other embodiments will be described.

Figure 6:
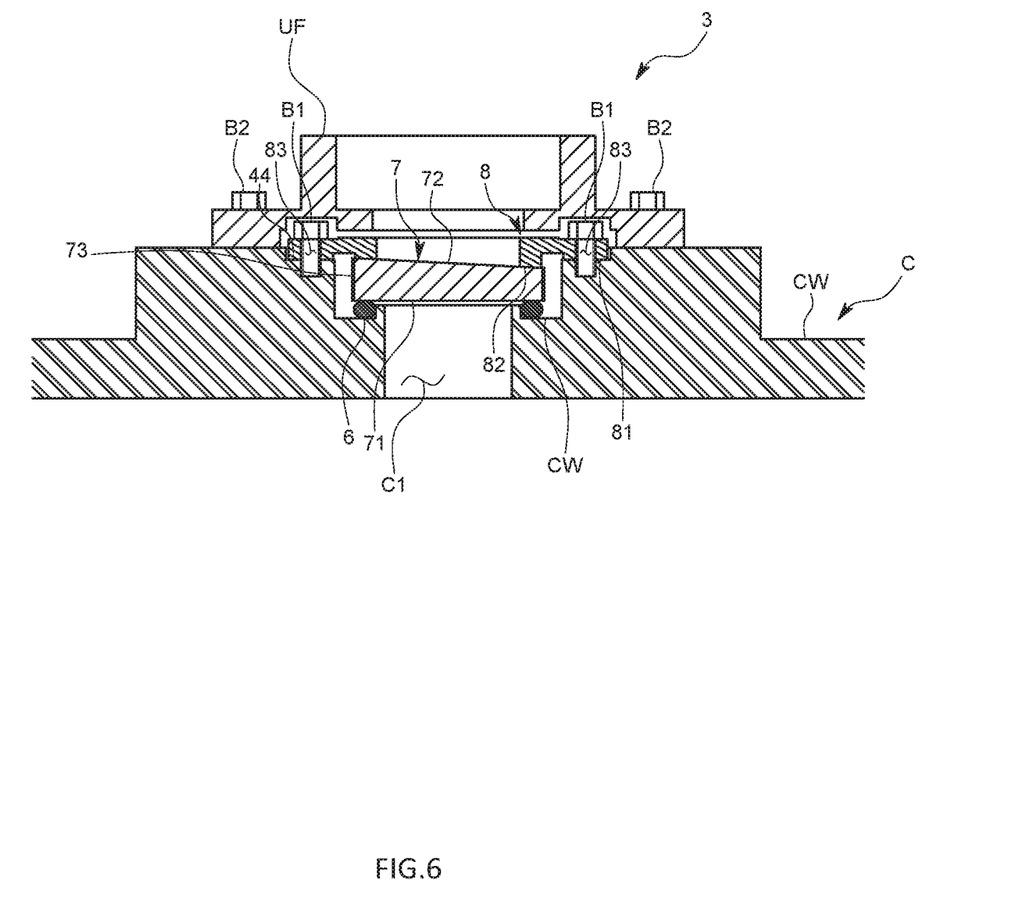
FIG. 6 is a schematic diagram illustrating the structure of a flange part of an absorption analyzer in another embodiment of the present invention.

The configuration of the flange part 3 of the absorption analyzer according to the present invention is not limited to that in the above-described embodiment. For example, as illustrated in FIG. 6, the flange part 3 may be one that is not provided with the base flange 4 in the above-described embodiment and is attached using a structure formed on the outer surface CW of the chamber C as a vessel. That is, it may be configured to provide the window material 7 in the first opening C1 of the chamber C, provide the second seal member 6 between the outer surface CW of the chamber C and the inner surface 71 of the window material 7, as well as fix the fixing surface 81 of the pressing body 8 to the outer surface CW of the chamber C, and allow the tilted surface 82 to press the window material 7 against the chamber C side.

In the above-described embodiment, the concentration of the analysis target gas is calculated; however, the absorption analyzer may be configured to detect whether or not the analysis target gas exists in the chamber.

The light emission module and the light detection module are not limited to those arranged opposite to each other, but may be arranged on the same side with respect to a wall surface of the vessel. For example, it may be adapted to arrange a mirror in the vessel, emit the light from the light emission module, and detect light reflected by the mirror by the light detection module.

The processing by the arithmetic unit may be performed using an arithmetic function inside the laser module. Also, the functions of the temperature controller, the laser module, and the arithmetic unit may be implemented in one computer.

The tilted surface of the pressing body and the outer surface of the window material are not required to be completely fitted together. For example, some misfit may exist to the extent that the pressing body does not contact with the base flange when the seal member is compressed by the window material.

As an example of the vessel, the chamber is cited; however, the absorption analyzer according to the present invention may be used for another vessel having a space inside.

Besides, various modifications and combinations of parts of the respective embodiments may be made without departing from the scope of the present invention.

REFERENCE SIGNS LIST

100: Absorption analyzer
4: Base flange
6: Second seal member
7: Window material
71: Inner surface
72: Outer surface
8: Pressing body
81: Fixing surface
82: Tilted surface

The invention claimed is:
1. An absorption analyzer, comprising:
  a light emitter that is attached covering a first opening of a vessel into which an analysis target gas flows or in which the analysis target gas is produced and emits light into the vessel; and
  a light detector that detects the light emitted from the light emitter and passing through the vessel, wherein
  the light emitter comprises:
    a base flange that is attached around the first opening on an outer surface of the vessel;
    a window material having opposing outer and inner surfaces, wherein the outer surface is inclined with respect to the inner surface and the inner surface is in contact with an inside of the vessel;

a seal member that is sandwiched between the base flange and the inner surface of the window material; and a pressing body including a fixing surface fixed to the base flange and a tilted surface pressing the outer surface of the window material against a base flange side.

2. The absorption analyzer according to claim 1, wherein in a state where the fixing surface of the pressing body is fixed to the base flange, the window material compresses the seal member and the inner surface of the window material separates from the base flange.

3. The absorption analyzer according to claim 2, wherein the base flange comprises:
   a through hole inside which the window material and a part of the pressing body are arranged;
   a support part that protrudes inward from an inner circumferential surface of the through-hole and supports the seal member; and
   an attachment surface attached with the fixing surface of the pressing body, and
in a state where the fixing surface of the pressing body is fixed to the attachment surface of the base flange, the window material separates from the inner circumferential surface of the through-hole and from the support part.

4. The absorption analyzer according to claim 1, wherein the light emitter further comprises a sheet heater provided on a side surface of the window material.

5. The absorption analyzer according to claim 4, wherein the light emitter further comprises a temperature sensor that measures a temperature of the window material, and
the absorption analyzer further comprising a temperature controller that, on a basis of a measured temperature measured by the temperature sensor and a set temperature, controls the sheet heater.

6. The absorption analyzer according to claim 1, wherein the base flange is made of metal, and
the pressing body is made of resin.

7. The absorption analyzer according to claim 6, wherein the pressing body is formed of polyphenylene sulfide (PPS).

8. The absorption analyzer according to claim 1, wherein the light detector is attached covering a second opening that is formed opposite to the first opening of the vessel.

9. The absorption analyzer according to claim 1, further comprising
a concentration calculation part that, on a basis of an output of the light detector, calculates concentration of the analysis target gas.

10. An absorption analyzer comprising:
a light emitter that is attached covering a first opening of a vessel into which an analysis target gas flows or in which the analysis target gas is produced and emits light into the vessel; and
a light detector that detects the light emitted from the light emitter and passing through the vessel, wherein
the light emitter comprises:
   a window material having opposing outer and inner surfaces, wherein the outer surface is inclined with respect to the inner surface and the inner surface is in contact with an inside of the vessel
   a seal member that is sandwiched between a circumference of the first opening and the inner surface of the window material on an outer surface of the vessel; and
   a pressing body including a fixing surface fixed to the outer surface of the vessel and a tilted surface pressing the outer surface of the window material against a vessel side.

11. The absorption analyzer according to claim 1, wherein both the outer surface of the window material and the tilted surface of the pressing body are inclined in a same direction.

12. The absorption analyzer according to claim 10, wherein both the outer surface of the window material and the tilted surface of the pressing body are inclined in a same direction.

* * * * *